Jan. 2, 1968 J. ANTONIO 3,361,896

RELIABILITY CHECKING SYSTEM FOR DATA SENSING DEVICES

Filed June 14, 1962

INVENTOR
John Antonio

BY Louis Etlinger
ATTORNEY

United States Patent Office 3,361,896
Patented Jan. 2, 1968

3,361,896
RELIABILITY CHECKING SYSTEM FOR DATA SENSING DEVICES

John Antonio, Fairfield, Conn., assignor to Sperry Rand Corporation, New York, N.Y., a corporation of Delaware Filed June 14, 1962, Ser. No. 202,627
16 Claims. (Cl. 235—61.11)

This invention relates to data sensing devices and more particularly to systems for electrically checking the operation and condition of data sensing devices, such as card readers, punched paper tape readers, punched card sorters, and the like, wherein the sensing of digital states is performed.

Data handling systems utilizing punched cards and punched tapes are well known in the art as input media to high speed computers. One of the critical problems is the prevention of errors in reading data that is presented on these punch tapes and punched cards since any error generated during the input operation will of course be perpetuated many times as the data is processed.

One of the known methods of checking the system for reading input data is to re-read the punch tape or punch cards twice and compare the two readings. If they do not agree, then the assumption is made that there is an error caused by malfunction of the system. Other known approaches can only indicate when a component in the sensing system has failed. In addition, duplicate sets of equipment and comparison circuitry is required which results in more complex and costly apparatus. Such failures in the optical reading systems, are for example, the failure in the light source, the blocking off of the apertures which define the light passage ways to the individual card perforation, aging of the photoresponsive devices and the associated electronic amplifiers, and the indicating equipment.

It is therefore an object of this invention to provide new and improved data sensing equipment.

It is another object of this invention to provide new and improved punched tape and card readers with reliability checking features.

It is a further object of this invention to provide a new and improved punched card reader which checks itself before and after each card is read.

It is still a further object of this invention to provide a system which checks itself before and after each card is read to determine if the elements of the system have deteriorated below a predetermined operating level.

It is a further object of this invention to provide a perforated tape reading system which checks itself before and after preselected units of information are sensed to determine if elements of the system have deteriorated below a predetermined operating level.

It is still a further object of this invention to provide a system for sensing information which checks itself in the all "on" mode to determine if the operating condition of the sensing and other elements of the system have deteriorated below a predetermined level.

It is still a further object of this invention to provide a system for sensing information which checks itself in the all "on" and all "off" mode to determine if the operating condition of the sensing and other elements of the system have deteriorated below a predetermined level.

Figure 1:
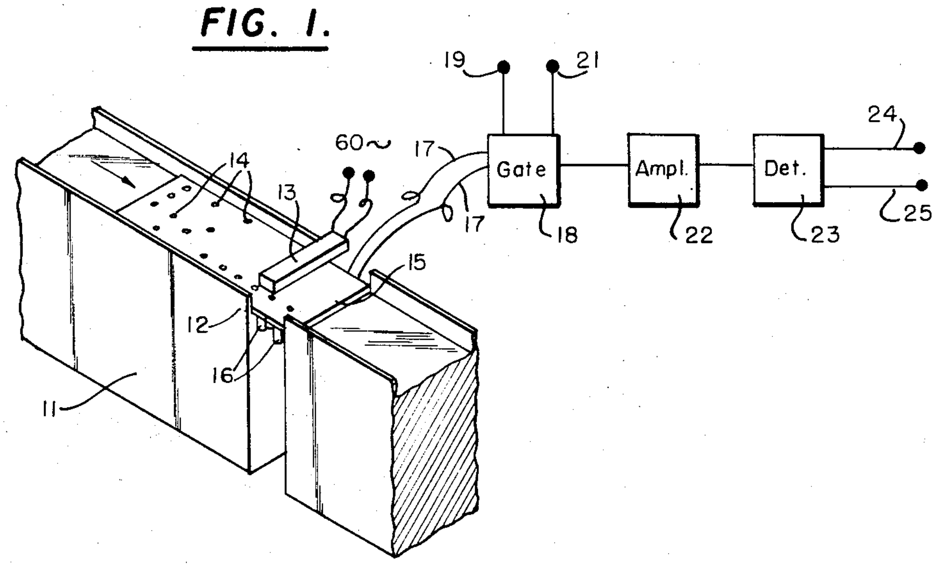
Figure 2:
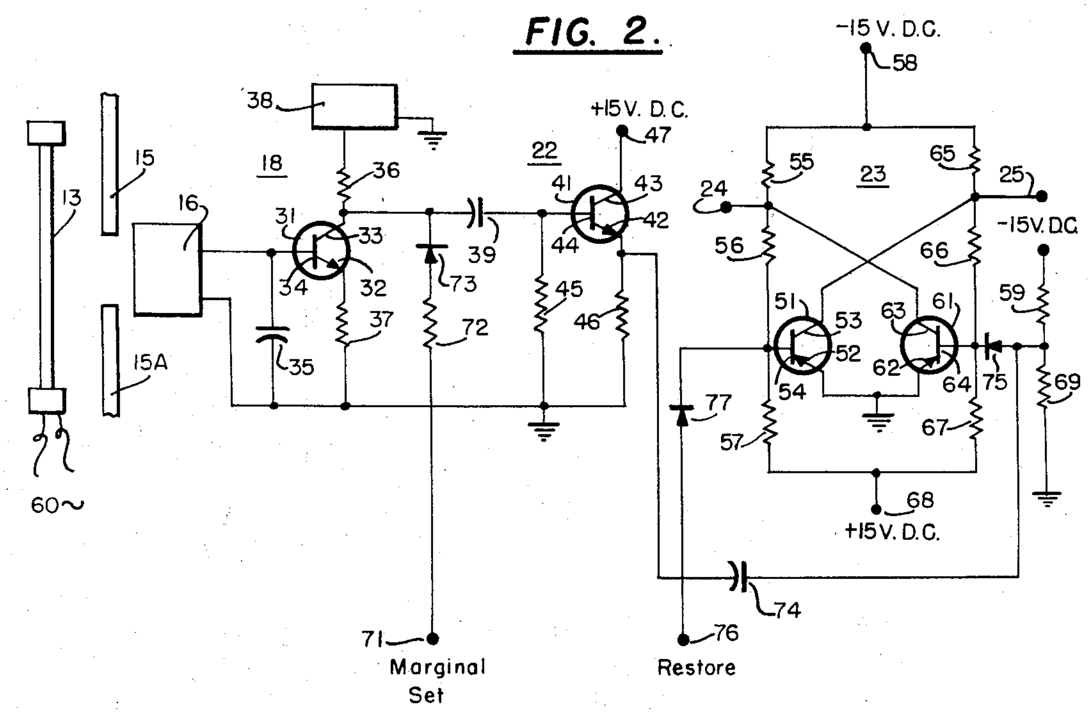

Other objects and advantages of this invention will become more apparent as the following description proceeds, which description should be considered together with the accompanying drawings, in which FIGURE 1 is a showing, partially in block form, of the basic components of one embodiment of the invention; and FIGURE 2 is a schematic diagram of the embodiment shown in FIGURE 1.

Before going into a detailed description of the drawings, general principles of the operation of the invention should be considered. The invention contemplates broadly the method and apparatus which senses binary information and is self-checking to not only determine and indicate whether a component has failed but to determine and indicate if there has been a deterioration in any of the elements of the system. The level of deterioration to be tolerated can be preselected and level sensing circuitry is provided to give an indication when various conditions and components cause the operating level of the system to fall below the preselected level. Although the embodiment to be described utilizes light sensing elements, the principle of the invention can be applied to any type of system which utilizes two different states as an information source.

In carrying out the invention, it is possible to operate in either the all "on" mode alone, or the combination of the all "on" and all "off" mode. In the embodiment described utilized by the cards, the "on" mode occurs between cards. The all "off" mode can be utilized in any space in the cards where there are no perforations, for example: either in the area between the edge of the card and the first column of perforations or the space between two adjacent columns.

In the case of punch paper tape the all "on" mode can be achieved by providing at preselected intervals, such as a blockette of data, a set of perforations across the tape in all information positions. The all "off" mode in a punch tape can be performed at any place where the tape is not perforated, such as between adjacent columns of holes.

In carrying out the embodiment of the invention shown in the drawings, a card reading system is provided having a reading station, including a light source which is directed to pass through perforations in the card, wherever they appear, to energize appropriate light responsive devices. The output from the light responsive devices is, in turn, fed to a multiple input gate which is arranged in the embodiment shown so there is no output when the light responsive cell is activated by a perforation in the card and the amplifier is pulsed.

The output from the gate is, in turn, fed to a level sensing means. When it is desired to test the condition of the system a signal of preselected level activates the gate during the test condition which, in turn, is fed to the level sensing means which gives an indication if the signal from the output to the system is above a predetermined level.

Referring now to the drawings in detail, and to FIG. 1 in particular, the reference character 11 generally designates a perforated card or tape reader having a reading station 12 which includes a source 13 of light, which light is directed to pass through perforations 14 in a card or tape 15 to energize appropriate photosensitive cells 16 on the opposite side of card 15. The output from the cells 16 is connected by wires 17 to the input of a gate circuit 18. Two terminals 19 and 21 are provided in the gate circuit 18 for conditioning the gate to pass signals from the photo-responsive cells 16.

The mode of operation for the gate 18 shown in block form in FIG. 1 and, in detail in FIG. 2, is that a signal of relatively low level appears in the output of gate 18 when signals in the proper amplitude appear at lines 17 and either 19 or 21. In the case where no signal is applied to lines 17 and a signal is applied at either lines 19 or 21 a relatively high level signal appears at the output of gate 18. The output from the gate 18 is connected to an amplifier 22, and the output from the amplifier 22 is applied to one input of a detector 23.

The two output lines from the detector 23 are connected to output terminals 24 and 25.

Only so much of the card or tape handling equipment as is necessary to adequately describe and illustrate the invention is shown on the drawings. The reader 11 is considered to have driving means such as driven rollers or the like which are commonly used for moving punched cards and tapes from one location, through the machine and to another location. The cards 15 are propelled along the reader 11 until they reach the reading station 12. At the reading station 12, the cards 15 may be read either while stationary, or "on-the-fly." The newer equipment is designed to read the cards while they are in motion to reduce the time required for reading. In either case, light passes from the lamp 13 through any suitable mask or other location defining means onto the top surface of the card 15 at the reading station 12. Wherever the card 15 is perforated, light will also pass through the perforations 14 to energize individual photo-responsive cells 16. The reading station 12 is arranged so that the light from the lamp 13, or several lamps if that proves to be a better arrangement, is directed by appropriate apertures and masks to each of the several perforation positions which comprise a card or tape column or row. Thus, as the card or tape 15 moves toward the right as shown in FIG. 1, the light falls upon the columns or rows, as the case may be, in sequence from one end of the card to the other. A single information transmission channel comprising the gate 18, the amplifier 22 and the detector 23 is provided for each of the photo-responsive cells 16, and there is a separate photo-responsive cell 16 for each perforation position in the column. As a column of perforations passes between the light source 13 and the photo-responsive cells 16, an energizing pulse is applied to the terminal 19 of all of the gates 18 to condition the gates for the passage of information. Thus, each position in the column at the reading station 12 which has a perforation passes light, and its photo-responsive cell 16 is irradiated. The output from each photo-responsive cell 16 is applied to its gate 18 and the conditioning pulse is applied to its terminal 19 during the duration of the output signal from the photo-responsive cell. The information output, depending on whether a 0 or 1 is read from the card, from the gate 18 is amplified and applied to one input of the detector 23 to change its state. Output terminal 24 normally has a high potential on it and terminal 25 is normally low.

To better understand the operation of the invention, reference is made to the circuit of FIG. 2. The lamp 13 is shown diagrammatically adjacent a pair of cards 15 and 15A. A photo-responsive cell 16 arranged to receive light passing from the lamp 13 has its output connected to the base electrode 34 of a transistor 31 which also has an emitter electrode 32 and a collector electrode 33. A capacitor 35 is connected between the base electrode 34 and ground. The emitter electrode 32 is connected through a resistor 37 to ground, and pulsating electrical energy is applied between ground and the collector electrode 33 from a source 38 and through a resistor 36. The collector electrode 33 is connected through a capacitor 39 to the base electrode 44 of a second transistor 41 which also has an emitter electrode 42 and a collector electrode 43. The emitter electrode 42 is connected to ground through a resistor 46 and the collector electrode 43 is connected to a terminal 47 which is at +15 volts D.C. A resistor 45 connects the base electrode 44 with ground. The output from the amplifier 22 is taken from the emitter electrode and across the resistor 46 and is applied through a capacitor 74 and a diode 75 to the base electrode 64 of a transistor 61 which also has an emitter electrode 62 and a collector electrode 63. Transistor 61 is one transistor of the flip-flop which is one form of a detector 23, and which also includes a transistor 51 having an emitter electrode 52, a collector electrode 53 and a base electrode 54. The transistors 51 and 61 are cross-connected with the collector electrode 53 connected through a resistor 66 to the base electrode 64, and the collector electrode 63 connected through a resistor 56 to the base electrode 54. One output terminal 24 is connected to the collector electrode and the other output terminal 25 is connected to the collector electrode 53. Resistors 55 and 65 connect a terminal 58 maintained at −15 volts D.C. to the collectors 63 and 53 respectively. Resistors 57 and 67 connect the base electrodes 54 and 64 respectively to terminal 68 which is maintained at +15 volts D.C. A voltage divider comprising resistors 59 and 69 is connected between a −15 volt point and ground with the junction of the two resistors 59 and 69 connected to the base electrode 64 to bias that electrode. A marginal set pulse to test the system is applied to terminal 71 to the collector 33 of transistor 31 through the resistor 72. The value of resistor 72 and the amplitude of the pulse applied to terminal 71 are selected so that stage 31 is deliberately deteriorated to operate in the region of its marginal operating point. A pulse to restore the flip-flop 23 to its normal state is applied to terminal 76 and through diode 77 to the base electrode 54.

In operation during the normal reading cycle when a perforated card or other data medium having a perforation representing a 1 is being read, light from the lamp 13 passes through perforation 14 in the data medium 15 and impinges on the photo-responsive element 16. The photo-responsive cell 16 produces an output which is applied to the base electrode 34 and causes the transistor 31 to assume a conductive state. During this time interval a positive pulse is applied through resistor 36 to the collector of transistor 31 from pulse source 38. Since transistor 31 is in a conductive state and the value of resistor 37 is chosen to be comparatively low, the positive pulse from 38 will pass through the transistor collector to emitter to ground with the result that there is very little or no output signal appearing across the collector of the transistor. The circuit parameters have been chosen so that the signal obtained under these conditions is not sufficient to set the flip-flop 23.

During the normal reading operation where the record medium is not punched representing a 0, light does not pass through the medium. The photo-responsive cell 16 is not activated and no signal is therefore applied to the base of transistor 31, leaving transistor 31 in a non-conductive state. Since a positive pulse from source 38 is applied during the reading interval and the impedance across transistor 31 is now high, the positive signal from source 38 will be transmitted to transistor 41 through condenser 39. The output from transistor 41 is applied to the flip-flop 23 and is of sufficient magnitude to set it to a 0 condition.

The pulses from the source 38 are derived from the synchronization system of the reader so that the information on the data medium is read at the proper time. Before each card enters the reading station 12 and after the card leaves the reading station 12, light from the lamp 13 illuminates all of the photo-responsive cells 16 in the entire column. This provides the opportunity to check all of the reading elements to determine whether or not they are functioning properly. As was mentioned above, aging of the photo-responsive cells, dirt in the apertures, low potentials on the transistors and photo-responsive cells, weak lamps, and other effects of use and time may render one or several of the overall reading channels ineffective to perform their function properly. To check the channels between cards, positive pulses of a selected level are applied to the marginal probe terminal 71. This provides the transistor 31 with energization, but at a higher level than is usually available due to a lower value resistor 72. However, if sufficient light reaches the photo-responsive device 16, and that device is operating properly, a sufficiently large input signal should be applied to base electrode 34 to place transistor 31 in a conductive state. When the reading elements are operating properly, the conduction of the transistor 31 is sufficient to prevent the passage of a large enough pulse from source 38 and therefore from transistor 41 to set the flip-flop 23. When, however, one or more elements in the reading path are not functioning properly, the impedance of transistors 31 is high, thereby permitting the transmission of the pulse from source 71, and transistor 41 will, in turn, provide a pulse to the base electrode 64 of the transistor 61, of sufficient magnitude to turn on that transistor, and set the flip-flop 23. The output terminal 25 then acquires a high potential and terminal 24 has a low potential.

A reset pulse applied to the restore terminal 76 will return any set flip-flop 23 to its restored condition with the resultant generation of an output pulse selected to cause triggering of the flip-flop 23 to indicate that elements of the system reach a predetermined state of deterioration. That output pulse can be used to signal the state of the reading channels. This output signal is not an indication that a reading error has occurred, but merely indicates that the reading channel as a whole has deteriorated to the point where errors can be expected if such deterioration continues. The point at which an output signal is generated can be selected by adjusting any or all of several elements. The flip-flop 23 uses a bias such as from voltage divider 59–69, or other means to establish a potential which must be overcome before the state of the flip-flop can be changed. This provides a minimum size pulse which must be applied to the base electrode 64 before the circuit signals a poor condition. The level of the marginal set pulse applied to the terminal 71 is similarly selected to cause triggering of the flip-flop when the elements of the system reach a predetermined state of deterioration.

The above operation of the equipment of FIGS. 1 and 2 has indicated how most of the reading channel can be checked for deterioration. However, a short or low resistance leakage path between the collector and emitter electrodes of the first transistor 31 and the proper operation of the detector 23 are not indicated by the all "on" method described nor is the flip-flop 23 checked. To ensure a complete check of the entire channel, the system can be operated in the all "off" mode. In addition to providing a complete check of the entire channel, the utilization of both the all "on" and all "off" check permits the use of photo-conductive elements such as photo-controlled transistors, photo-controlled diodes and the like instead of photo-voltaic devices when only the all "on" mode is used. This means providing a prescribed column or point in the card or tape channel when the gate 18 is conditioned and there are no perforations at the reading station 12.

In a synchronous machine, as indicated above, a clock pulse generator generates pulses so timed that they condition the gates in the system at the proper time for each operation. Thus, timing pulses are generated at the time intervals which are the same as the time required for a card or tape to move from one column to another. For the testing operations described, the clock must also generate output pulses to be applied to the terminal 19 of the gate 18 whenever the system is to be tested. For the all "on" test, a pulse is applied to the terminal 21 either between cards in a card machine, or in the case of a tape or at the time when a specially prepared column or row passes beneath the reading station. Or, the all "off" test can take place between columns. At any rate, it is necessary to pulse the gate 18 at the proper time for the tests to take place. Since in the all "on" test, a short circuit between the collector electrode 33 and the emitter electrode 32 of the transistor 31 would cause the system to operate the same as a properly operating channel, the all "off" check can be used if this condition is to be tested for. If there is a short circuit between the collector electrode 33 and the emitter electrode 32 then during the all "off" check the transistor 31 would conduct and the signal from source 38 would be shorted to ground through transistor 31. This signal would be of insufficient magnitude to signal the flip-flop 23. Thus the flip-flop would give an indication for a 1 during the all "off" condition when a properly working circuit should produce the output signal for a 0. In the case of the all "off" check, a reduced magnitude signal is not required on the "marginal set" terminal 71; instead the signal is applied from the source 38 of the same amplitude used in the timing process. In the case of the all "off" check mode when the circuit is operating satisfactorily, the operation is the same as when a 0 is read from a card where no light reaches the photo-responsive device 16. The transistor 31 is in a non-conductive high impedance state and the pulse from source 38 is transmitted to transistor 41 where it, in turn, triggers the flip-flop 23, giving the indication for a 0. Thus the entire channel, beginning with the transistor 31, is checked by the all "off" test mode. The all "on" test mode checks the reading system as described hereinabove.

Although a flip-flop has been used as an example of a level detector, any circuit which responds to voltage levels can be used for the purpose. Examples are differential amplifiers, potential sensitive amplifiers or gate circuits, or the like, which may be substituted for the flip-flop 23.

Since the system is synchronous there is no problem in determining what test is being performed and the significance of the output signal produced.

This specification has described a system for checking the elements in an optical perforated record reader to indicate when those elements have deteriorated to the point where they require servicing. It is realized that this description may indicate to those in the art other ways in which the principles of this invention can be used, and it is, therefore, intended that this invention be limited only by the scope of the appended claims.

I claim:

1. A machine for reading information from perforated record members in which the record members are divided into a plurality of columns having several perforation positions in each of said columns, and on which information is represented by combination of perforations present and absent in the several positions in each column of the record member, said machine including a reading station having a source of light and light sensitive elements responsive to the passage of light from said source of light through perforations in any column of said member, gate means connected to the outputs of said light sensitive elements to pass signals representative of an irradiated light sensitive element when electrical energy from a second source is also applied to said gate means, first means for applying a first pulse to said gate for enabling reading of said columns, second means for applying a second pulse to said gate, said second pulse being of an amplitude to render said gate non-conducting when a proper signal from said light sensitive element is also applied to said gate, means for applying said second pulse during the time that perforations in each position are present at said reading station, and means for indicating when said gate does not conduct during the time when perforations in each position are present at said reading station.

2. A reader for perforated record members, said reader having a reading station at which information is read from said record members, said reading station including a source of light and light sensitive elements positioned to receive light passing through perforations in the record member being read, a gate connected to the output of each of said light sensitive elements, means for applying an energizing pulse to said gate during the time when no perforations are present at said reading station and when no record member lies between said source of light and said light sensitive elements, said gate being arranged to produce no output only when said pulse and an output signal from said light sensitive element are both present, the value of said pulse being selected to cause said gate to produce no output when the signal from said light sensitive element is proper and sufficient to cause said gate to produce an output when the signal from said light sensitive element falls below a prescribed value, and means responsive to the output from said gate to indicate when said gate produces no output when said pulse is applied to said gate.

3. The reader defined in claim 2 wherein said means for indicating when said gate produces no output comprises a flip-flop which is normally in a first conductive state and which is placed in a second conductive state when said gate produces an output.

4. A card reader for reading stored information from perforated record mediums in which information is stored by the combinations of perforations in individual columns or multi-column record mediums, said reader having a reading station which includes a source of light directed to irradiate one side of a record medium being read and light sensitive elements arranged on the other side of said record medium to be irradiated by light passing through perforations therein, means for moving a record medium to be read through said reading station to expose said information columns sequentially to said source of light, each of said light sensitive elements generating an electrical signal when irradiated with said light, the strength of said electrical signal being proportional to the amount of light impinging upon said light sensitive element, gate means connected to the output of said light sensitive elements to receive signals generated by said light sensitive elements, means to apply an electrical pulse to said gate when a portion of said record medium containing perforations in an entire column is present at said reading station and when the light from said source of light fully illuminates said light sensitive elements, said pulse being of sufficient amplitude to enable said gate to produce an output only when the signal from said light sensitive elements is above a prescribed value, said means also applying an electrical pulse to said gate when a portion of said record receiver containing no perforations is present at said reading station to prevent light from said source illuminating said light sensitive elements, and means for indicating when said gate does not produce an output when all perforations are present at said reading station and does produce an output when no perforations are present at said reading station.

5. The reader defined in claim 4 wherein a separate light sensitive element and gate is provided for each possible perforation position in a column of said record receiver so that each perforation position is checked.

6. A machine for reading information from perforated records, said machine comprising a reading station at which said records are read, said records being divided into a plurality of information columns, each of said columns having several possible perforation positions, information being recorded in said records by the combination of positions at which perforations appear in each column, said reading station being arranged to read all of the perforations in each column at the same time, gate means coupled to said reading station for receiving the electrical output therefrom, means for applying to said gate means a first electrical pulse during the time that no perforations are present at said reading station, means for applying a second electrical pulse when perforations in all column positions are present at said reading station, said first pulses being of sufficient amplitude to cause said gate to produce no output only if the signal from said reading station is above a prescribed amplitude, and means for indicating when said gate produces no output.

7. The machine defined in claim 6 wherein a separate reading station gate and indicating means is provided for each possible perforation position in a card column.

8. The machine defined in claim 6 wherein said indicating means is a voltage sensitive amplifier.

9. A machine for sensing informaion from perforated record mediums in which information is represented by combinations of perforations, said machine including a reading station having a light source and light sensitive elements responsive to the passage of light through perforations in said record medium, a threshold device connected to the outputs of said light sensitive elements, a first signal source connected to said threshold device, a second signal source connected to said threshold device, said threshold device having the characteristic of producing a first level of signal output when signals are applied from said light sensitive elements and from either one of said first and second signal sources, said threshold device producing a second level of signal output when no signal appears from said light sensitive elements and a signal is applied from either said first or second signal sources, said first signal source being applied during a checking operation, said second signal source having a signal level so selected to produce a signal of said second level from said threshold device if the reading system has deteriorated below a predetermined level, and signal level indicating means connected to said threshold device.

10. The machine of claim 11 wherein said second signal source is applied during a checking operation at periods when all the light sensitive elements are illuminated to check the operation of said reading station.

11. The machine of claim 9 wherein said first signal source is applied during a period when a portion of the record means having no perforations is at the reading station to check operation of said threshold device and said signal level indicating means.

12. The reader defined in claim 9 above wherein said threshold device consists of a variable impedance which is controlled by the application of a signal from said light sensitive means.

13. The device of claim 9 wherin said variable impedance device consists of a transistor having a base, emitter and collector element, said base being connected to the output of said light sensitive element, said first signal source connected to said collector, said second signal source connected to said collector through a unidirectional device, and said emitter connected to a source of common potential, the output from said transistor being taken at said collector, said transistor being biased so that it is normally non-conductive in the absence of a signal from said light sensitive element.

14. The device of claim 9 wherein said signal level indicating means consists of a flip-flop arranged to change its state upon the application of a signal of at least a preselected level.

15. The device of claim 9 wherein said level indicating means consists of a voltage sensitive amplifier.

16. The device of claim 9 wherein said indicating means consists of a differential amplifier.

References Cited

UNITED STATES PATENTS

| | | | |
|---|---|---|---|
| 2,817,480 | 12/1957 | Baldwin | 340—146.3 |
| 2,677,815 | 5/1954 | Brustman | 340—213 |
| 2,838,538 | 8/1958 | Hunt | 178—30 |
| 3,086,121 | 4/1963 | Cockrell | 252—2.9 |

MAYNARD R. WILBUR, *Primary Examiner.*

J. I. SCHNEIDER, *Assistant Examiner.*

UNITED STATES PATENT OFFICE
CERTIFICATE OF CORRECTION

Patent No. 3,361,896 January 2, 1968

John Antonio

It is hereby certified that error appears in the above numbered patent requiring correction and that the said Letters Patent should read as corrected below.

Column 8, line 28, for the claim reference numeral "11" read -- 9 --; line 41, for "wherin" read -- wherein --.

Signed and sealed this 18th day of February 1969.

(SEAL)
Attest:

Edward M. Fletcher, Jr.
Attesting Officer

EDWARD J. BRENNER
Commissioner of Patents